(12) United States Patent
Kopf et al.

(10) Patent No.: US 8,556,739 B2
(45) Date of Patent: Oct. 15, 2013

(54) MAIN SHAFT FOR A TRANSMISSION OR COUNTERSHAFT FOR A TRANSMISSION

(75) Inventors: Andreas Kopf, Bietigheim (DE); Alexander Weidler, Stuttgart (DE)

(73) Assignee: Daimler AG, Stuttgart (DE)

( * ) Notice: Subject to any disclaimer, the term of this patent is extended or adjusted under 35 U.S.C. 154(b) by 188 days.

(21) Appl. No.: 12/743,887

(22) PCT Filed: Sep. 9, 2008

(86) PCT No.: PCT/EP2008/007361
§ 371 (c)(1),
(2), (4) Date: May 20, 2010

(87) PCT Pub. No.: WO2009/068126
PCT Pub. Date: Jun. 4, 2009

(65) Prior Publication Data
US 2010/0307275 A1 Dec. 9, 2010

(30) Foreign Application Priority Data

Nov. 28, 2007 (DE) .......................... 10 2007 057 194

(51) Int. Cl.
*F16C 3/02* (2006.01)

(52) U.S. Cl.
USPC .......................................... 464/181; 464/180

(58) Field of Classification Search
USPC ..................... 74/467; 464/180, 181
See application file for complete search history.

(56) References Cited

U.S. PATENT DOCUMENTS

| | | | |
|---|---|---|---|
| 6,955,167 B2* | 10/2005 | Baratta | 125/21 |
| 7,278,894 B2* | 10/2007 | Lyon et al. | 440/83 |
| 2007/0277645 A1* | 12/2007 | Weisskopf et al. | 74/579 E |

FOREIGN PATENT DOCUMENTS

| | | |
|---|---|---|
| DE | 10260115 A1 | 7/2004 |
| DE | 102005008015 A1 | 8/2006 |
| DE | 102005052456 A1 | 5/2007 |
| EP | 1170117 A1 | 1/2002 |
| JP | 60084472 A | 5/1985 |
| JP | 61017711 A | 1/1986 |
| JP | 2000238140 A | 9/2000 |
| JP | 2002213429 A | 7/2002 |
| WO | 2004056553 A1 | 7/2004 |

* cited by examiner

*Primary Examiner* — David M Fenstermacher
*Assistant Examiner* — Terence Boes
(74) *Attorney, Agent, or Firm* — Stephen A. Pendorf; Patent Central LLC

(57) ABSTRACT

A main shaft for a transmission or a countershaft for a transmission shall be constructed in an especially light-weight manner. The transmission of high torques, such as is the case for the main shaft or countershaft for a transmission, is problematic when the base body of the shaft consists of a fiber composite material. A metal element (20, 22) is now laminated into the base body, and a gearwheel (28, 30) can then be connected to this metal element (20, 22) in a force-fit manner, so that high torques can be transmitted.

7 Claims, 1 Drawing Sheet

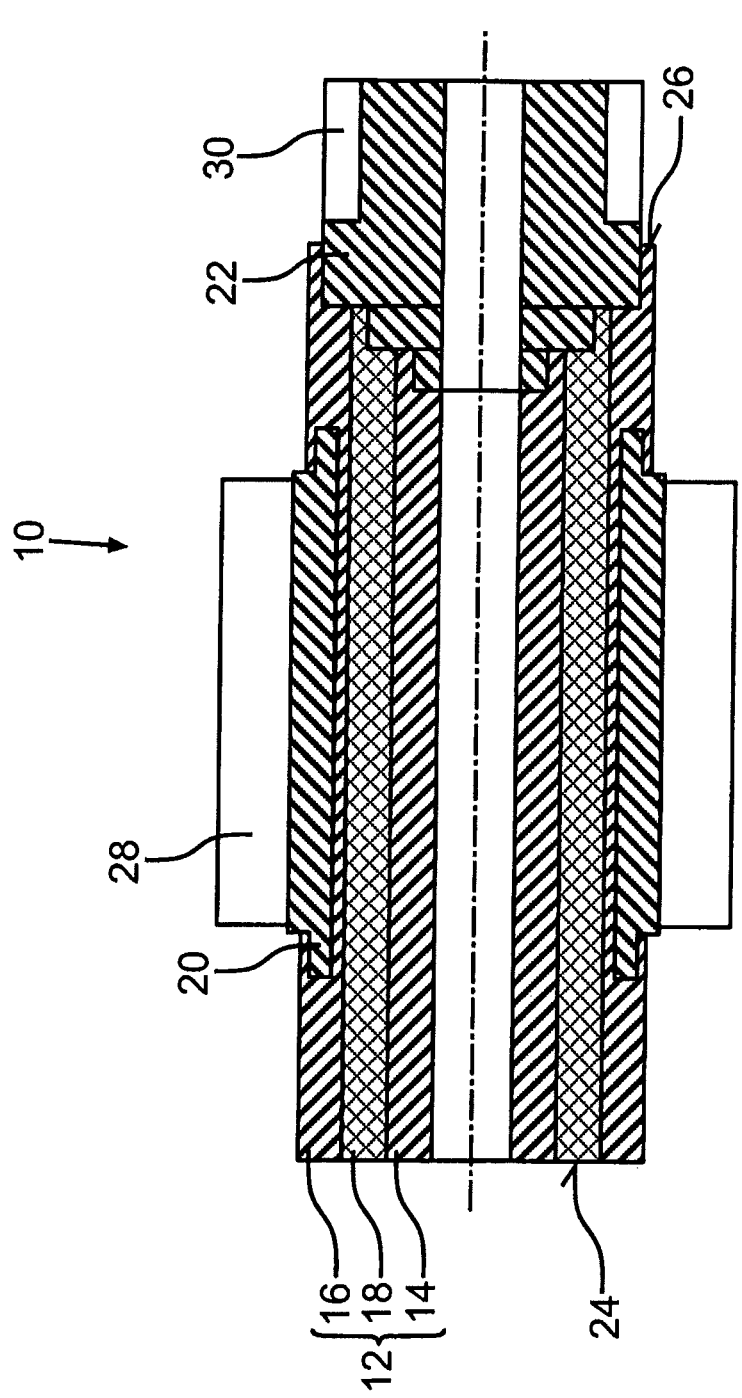

MAIN SHAFT FOR A TRANSMISSION OR COUNTERSHAFT FOR A TRANSMISSION

BACKGROUND OF THE INVENTION

1. Field of the Invention

The invention relates to a shaft which is responsible for the transmission of torques in a transmission. This can be the main shaft for the transmission or the countershaft for the transmission.

2. Description of the Related Art

One tends to produce many components of light material for saving weight, especially in motor vehicles. This is also valid for shafts. Thus, a drive shaft of fiber-reinforced plastics is described in DE 29 465 30 A1, and a power train of carbon fiber composite material is described in DE 195 383 60 C1. DE 102 601 15 B4 discloses a camshaft, where the cams are connected to the base body via a metal sleeve laminated into the base body of carbon fiber composite material.

The use of fiber composite material in transmissions has failed up to now, as transmission shafts mainly serve to transmit high torques. Metal parts have to be used hereby. It has not been achieved up to now to couple these to a transmission shaft of fiber composite material in such a manner to a transmission shaft that a torque can be transmitted in a sufficiently good manner.

It is thus the object of the invention to provide a main shaft for a transmission or a countershaft for a transmission which is constructed in an especially light-weight manner without having to accept restrictions during the operation of the transmission.

BRIEF SUMMARY OF THE INVENTION

The object is solved by a main shaft for a transmission or a countershaft for a transmission with a base body (12), wherein the base body (12) comprises an inner shell (14) and an outer shell (16) of fiber composite material, between which is arranged an open cell foam material (18), wherein the open-cell foam is suited for transmitting oil through the open-cell foam between the two shells, and wherein at least one metal element (20, 22) is laminated into the base body (12).

The shaft according to the invention thus comprises a base body which consists at least partially of a fiber composite material, wherein at least one metal element is laminated into the base body (namely into the fiber composite material). This metal element can then namely also be formed as an associated gearwheel in such a manner that the gearwheel can be coupled to the metal element, especially by means of a force-fit, e.g. the gearwheel can be mounted on the metal element. An intermediate member is thus provided between the metallic gearwheel and the base body of fiber composite material by means of the laminated metal element, whereby it is enabled to form the base body by means of such a fiber composite material. Hereby, a carbon fiber composite material is mainly considered.

The invention is based on the knowledge that the laminating of a metal element into a base body of carbon fiber composite material known from DE 102 601 15 B4 can also be used in a sensible manner if high torques are to be transmitted by means of the shaft equipped in such a manner, as is the case with shafts of transmissions (namely the main shaft for a transmission or the countershaft for a transmission according to the invention).

In an especially simple example, the base body has two ends, and the metal element is arranged at one of the ends. The gearwheel can thus be coupled to one of the ends.

One property of a shaft for a transmission is however also that the torque is not to be transmitted from one end of the shaft to the other, but is coupled in the center. In this case, the embodiment is sensible that the metal element is formed as a sleeve surrounding the base body. This is preferably applied in such a manner to the base body that it is spaced from the two ends of the base body.

The construction according to the invention can be developed further: foam material is even lighter than fiber composite material. The base body can thus partially be formed of foam material. Metal foams can be used, but plastic foam as for example foam of polyurethane can also be used in a sensible manner.

The foam material can be formed of closed-cell foam and of open-cell foam.

The closed-cell foam mainly increases the stability of the base body: the shaft is more stable with the same measurements, if the base body comprises closed-cell foam. It can be formed smaller, if the size of the stability is fixed.

The embodiment with open-cell foam is especially sensible if the foam material is arranged between two shells of fiber composite material. Fluid can then be transported via the foam material, wherein this is especially sensible for the (lubricating) oil in a transmission.

The invention can also be used in a transmission, especially for a motor vehicle (and even then for a motor vehicle with such a transmission), wherein the transmission according to the invention comprises a shaft according to the invention, namely a main shaft for a transmission and/or countershaft for a transmission as described above. A gearwheel is part of the transmission, which is coupled to a metal element, e.g. connected thereto in a force-fit manner, as is enabled by simple mounting.

The gearwheel can also be viewed as part of the main shaft for the transmission or countershaft for the transmission.

With the above-mentioned embodiment, where foam material of open-cell foam is used between two shells of fiber composite material, the transmission can comprise means for introducing or passing oil into or through the open-cell foam between the two shells.

BRIEF DESCRIPTION OF THE DRAWINGS

In the following, a preferred embodiment of the invention is described with regard to the drawing, in which the single FIGURE shows a main shaft for a transmission of the type according to the invention.

DETAILED DESCRIPTION OF THE INVENTION

A main shaft for a transmission designed as 10 altogether comprises a base body 12. This is formed in three layers, it namely comprises an inner tube or an inner shell 14 of carbon fiber composite material, an outer tube or an outer shell 16, also of carbon fiber composite material, and a metal foam 18 is present between the two shells. The base body 12 is especially light compared to a massive steel body. The base body 12 is also especially light and especially stable compared to a base body which consists completely of carbon fiber composite material, as it comprises the metal foam 18. Disruptive oscillations in the shaft 10 are also dampened by the metal foam 18, the structure-borne noise is thus suppressed.

Two metal elements 20 and 22 are now laminated into the base body 12. The metal element 20 is a metal sleeve, which is spaced from both ends 24 and 26 of the base body 12. A gearwheel 28 is mounted on the metal sleeve 20 for a force-fit connection. The metal sleeve 20 serves as an intermediate member for the transmission of torque from the gearwheel 28 to the shaft 10, especially its base body 12.

The second metal element 22 is a connection piece of metal. While the metal sleeve 20 is only laminated into the outer shell 16, the connection piece 22 at the end 26 of the base body 12 is laminated into the two shells 14 and 16 and the metal foam 18. A gearwheel 30 is also mounted on the connection piece 22, and torque can also be transmitted to the base body 12 via this gearwheel 30.

Methods known per se are used during the production of the main shaft 10 for the transmission. Three-dimensional woven fabrics can be used for the fiber composite material. The metal foam core 18 can be fixed between the two shells 14 and 16 by gluing, pressing or thermal foaming. The laminating can take place in the longitudinal and in the circumferential direction of the shaft 10 by means of known methods.

The invention claimed is:

1. A main shaft (10) for a transmission or countershaft for a transmission, with
 a base body (12), said base body (12) having two ends (24, 26), wherein the base body (12) comprises a tubular inner shell (14) of a fiber composite material and a tubular outer shell (16) of fiber composite material, between which inner and outer shells is arranged an open cell foam material (18), wherein the open-cell foam is a metal foam and is suited for transmitting oil through the open-cell foam between the two shells, and wherein at least one metal element (22) is arranged at one of the ends of the base body (12) and laminated to the inner shell (14) and the outer shell (16) of fiber composite material.

2. The shaft according to claim 1, in which the base body (12) has a metal sleeve (20) surrounding the base body, which sleeve is spaced from both ends (24, 26).

3. A transmission with a main shaft (10) for a transmission and/or a countershaft for a transmission according to claim 1, and with a gearwheel (28, 30), which is coupled to a metal element (20, 22).

4. The transmission according to claim 3 with means of introducing and/or passing oil into or through the open-cell foam (18) between the two shells (14, 16) of fiber composite material.

5. A motor vehicle with a transmission according to claim 3.

6. The transmission of claim 3, wherein said transmission is a motor vehicle transmission.

7. A transmission according to claim 3, wherein said gearwheel (28, 30) is coupled to the metal element (20, 22) in a force-fit manner.

* * * * *